United States Patent [19]

Smith

[11] Patent Number: 5,465,272
[45] Date of Patent: Nov. 7, 1995

[54] DATA TRANSMITTER BASELINE WANDER CORRECTION CIRCUIT

[75] Inventor: Robert W. Smith, Los Altos, Calif.

[73] Assignee: SynOptics Communications, Inc., Santa Clara, Calif.

[21] Appl. No.: 225,953

[22] Filed: Apr. 8, 1994

[51] Int. Cl.$^6$ .................................. H04L 27/04
[52] U.S. Cl. ............................ 375/295; 375/258
[58] Field of Search ........................ 375/219, 224, 375/258, 288, 295, 317, 377; 370/13, 32; 455/63, 67.3; 333/177–178; 327/38, 78–80

[56] References Cited

U.S. PATENT DOCUMENTS

| | | | |
|---|---|---|---|
| 4,186,384 | 1/1980 | Acker | 375/229 |
| 4,742,470 | 5/1988 | Juengel | 364/474 |
| 5,293,400 | 3/1994 | Monod et al. | 375/219 |

FOREIGN PATENT DOCUMENTS 2013415  8/1992  WIPO ................................. 375/319

Primary Examiner—Young Tse
Attorney, Agent, or Firm—Blakely, Sokoloff Taylor & Zafman

[57] ABSTRACT

In a terminal coupled to a computer network, a circuit for compensating for the baseline wander of received digital signals. The terminal is AC coupled to the computer network by a coupling transformer. The received digital signal is summed with a correction signal. The resulting summed signal is input to a comparator. This comparator compares the summed signal to a predetermined baseline level. Thus, the output signal from the comparator is fixed at the baseline level. The correction signal is the difference between the summed signal and the output signal from the comparator. The correction signal is filtered and amplified before being fed back to the comparator.

16 Claims, 4 Drawing Sheets

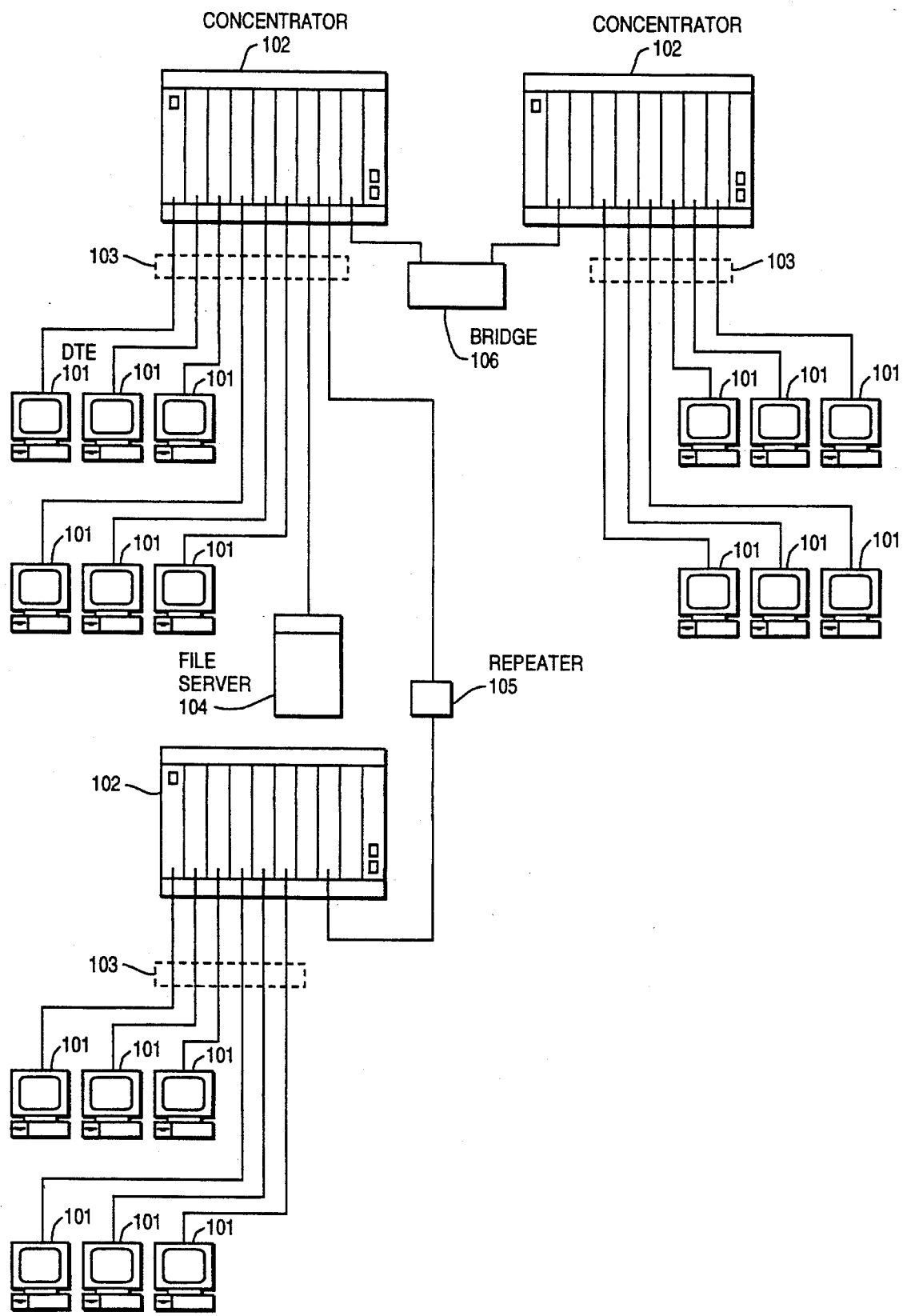
FIG_1

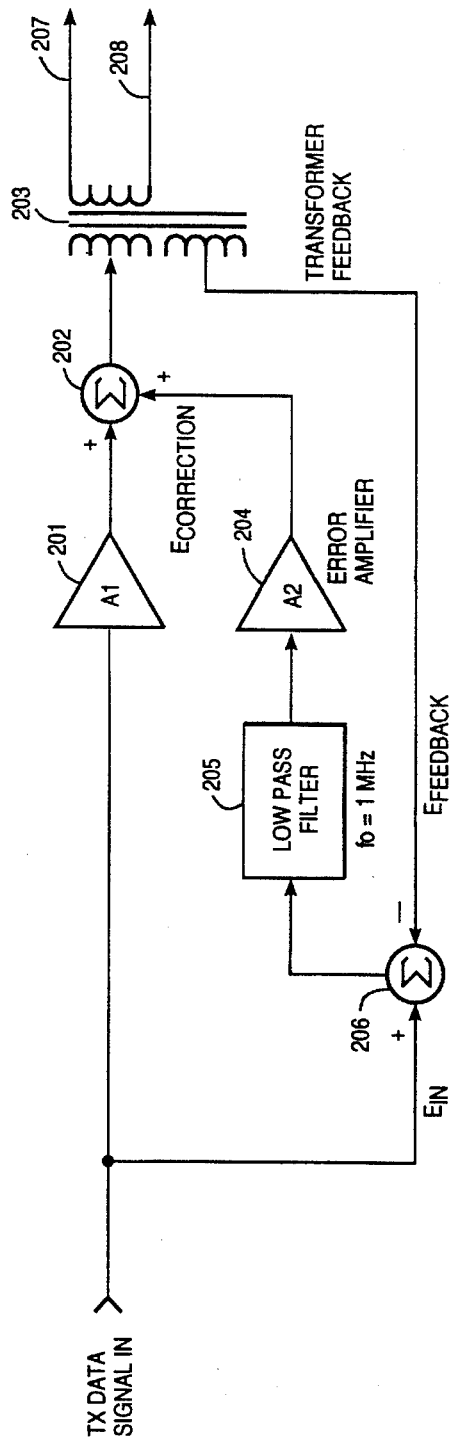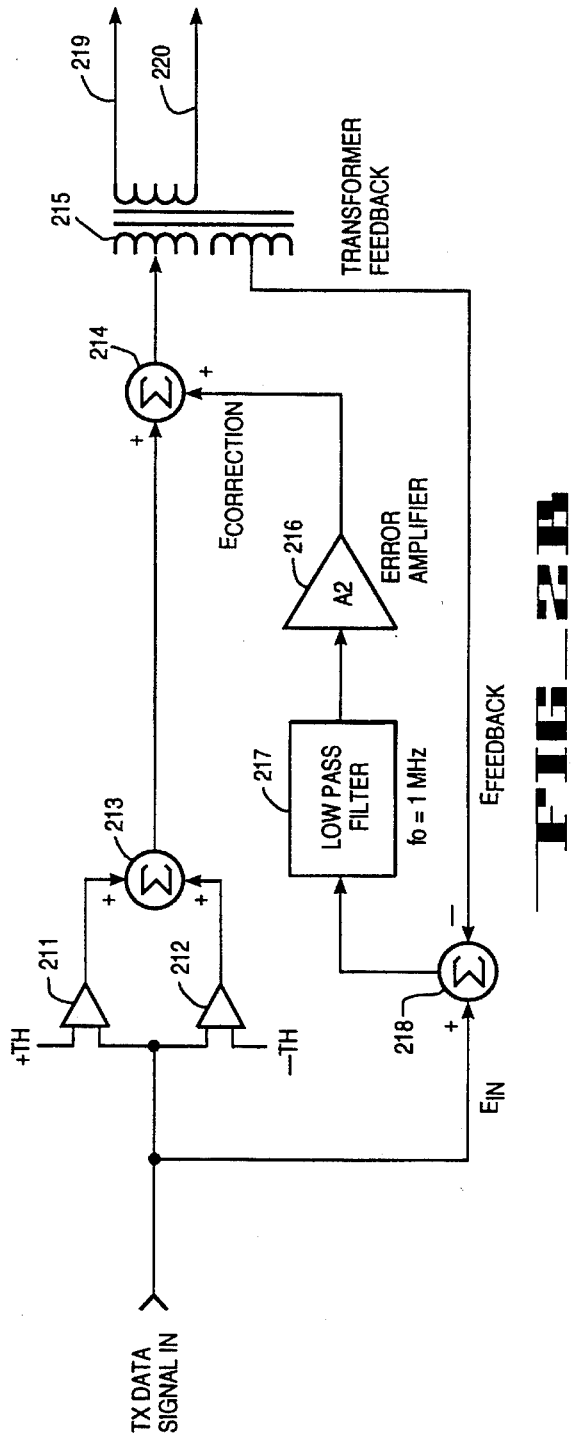

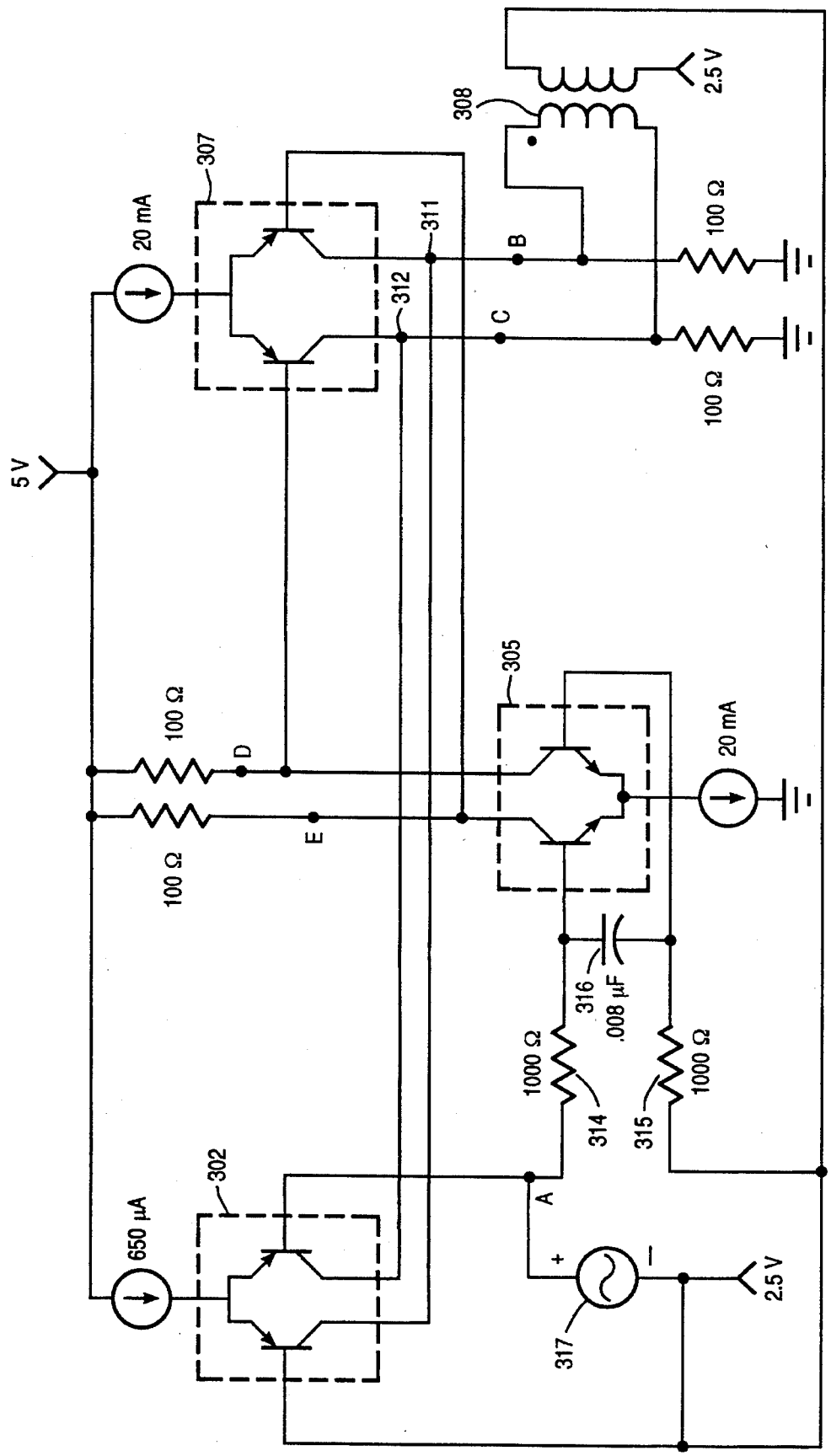
FIG_3

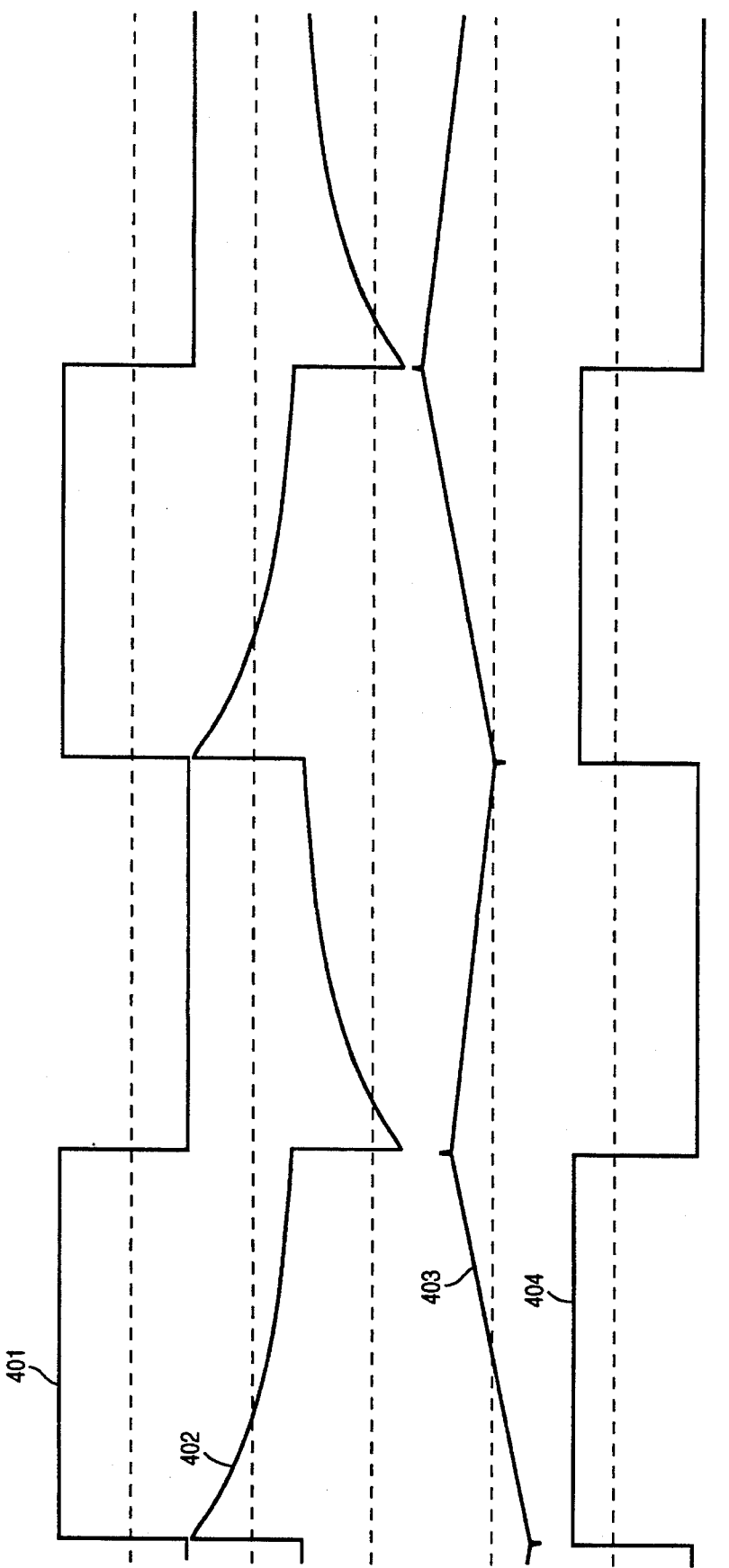
FIG_4

DATA TRANSMITTER BASELINE WANDER CORRECTION CIRCUIT

FIELD OF THE INVENTION

The present invention relates to the field of transmission lines. More particularly, the present invention pertains to an apparatus and method for minimizing the baseline wander of digital signals associated with computer networks having AC coupled transmission lines.

BACKGROUND OF THE INVENTION

Computer networks are becoming increasingly popular because of their versatility, flexibility, economy, and power. In contrast to the highly centralized and costly mainframes, computer networks typically distribute processing to various autonomous computers. These individual computers are coupled together so that each computer in the network can communicate with other computers connected to the network. Thereby, end users can work on a joint project on separate computers by sharing files and swapping information over the network. Furthermore, application programs, databases, and peripheral hardware (e.g., printers, disk drives, file servers, etc.) can be shared amongst the various end users. Moreover, the computer network can easily be upgraded by simply incorporating additional hardware on an as-needed basis.

Typically, a computer network is comprised of a number of data terminal equipment (DTE) coupled together by transmission lines. DTE can include personal computers, workstations, mini computers, input terminals, etc. There are several different types of transmission lines which can be used, such as unshielded twisted pair (UTP) wiring, shielded twisted pair wiring, coaxial cables, and fiber optic cables.

UTP wiring is a popular choice because of its relatively low cost. Significant savings can be achieved by using the same UTP telephone lines already existing in office buildings, factories, and homes, to conduct digital signals between DTE of a computer system, rather than analog voice signals for phone systems. By utilizing the UTP telephone wires, there is no need to separately purchase and physically route other wires or cables.

Thus, there is a need in the prior art for an apparatus and method that minimizes the baseline wander inherent in computer networks having transformer coupled UTP wiring. It would be highly preferable for such an apparatus and method to be installed in the base equipment and be compatible with existing transmitters and magnetics without having to substantially modify either the transmitters or receivers.

SUMMARY OF THE INVENTION

The present invention pertains to a data transmitter baseline wander correction circuit for use in terminals that are transformer coupled to a computer network. A signal taken from a separate winding of the transformer is fed back and subtracted from the transmit digital data signal to produce a correction signal. The correction signal is then low-pass filtered and amplified. A fixed level signal is generated by comparing the transmit data signal to a reference potential (e.g., sliced). A summer adds the correction signal to the fixed level signal to produce an output signal, which is transmitted to the computer network via the transformer.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 shows a typical computer network system upon which the present invention may be utilized.

FIG. 2A shows a block diagram of the currently preferred embodiment of the data transmitter baseline wander correction circuit.

FIG. 2B shows the block diagram of one embodiment for correction of baseline wander associated with a tri-state transmit signal.

FIG. 3 shows a circuit diagram of the currently preferred embodiment of the present invention.

FIG. 4 shows the values of the components which are directly applicable to silicon implementations and transformers.

DETAILED DESCRIPTION

A data transmitter baseline wander correction circuit is described. In the following description, for purposes of explanation, numerous specific details are set forth, such as encoding schemes, transmission mediums, gain levels, frequencies, filters, etc., in order to provide a thorough understanding of the present invention. It will be obvious, however, to one skilled in the art that the present invention may be practiced without these specific details. In other instances, well-known structures and devices are shown in block diagram form in order to avoid unnecessarily obscuring the present invention.

Referring to FIG. 1, a typical computer network system upon which the present invention may be utilized is shown. A number of users access the computer network through data terminal equipment (DTE) 101. DTE 101 can include personal computers, workstations, portable computers, minicomputers, dumb terminals, etc. DTE 101 are coupled to concentrators 102 by unshielded twisted pair cables 103. Additionally, a file server 104 can be coupled to a concentrator 102 so that users can share stored files, data bases, and application programs. Concentrators 102 act as focal points for managing and routing network data communications. Concentrators 102 can be coupled together. A repeater 105 can be used to amplify attenuated signals. A bridge 106 can be used to couple together two concentrators which service network segments having different protocols (e.g., an Ethernet-to-Token Ring bridge). Bridge 106 listens to data transmissions, examines each data packet's destination, makes any necessary conversions, and discriminately forwards each data packet.

The computer network of FIG. 1 can be expanded to encompass hundreds of users by adding extra DTEs, concentrators, repeaters, and bridges. Furthermore, a router can be used to interface networks having different network layers such as Token Bus versus X.25. In addition, various parts of the computer network can be configured any number of different topologies (e.g., star, ring, tree, et.) and different protocols such as Ethernet, token ting, token bus, etc. can be utilized. It should be noted that the present invention applies to any type of computer network configuration, regardless of size and make. In the currently preferred embodiment, the transmission lines 103 are comprised of unshielded twisted pair wiring. It should be further noted that the present invention is equally applicable to other types of wiring as well (e.g., shielded twisted pairs, quad pairs, AUI cables, UTP FDDI, untwisted pairs, etc.). Furthermore, the present invention is applicable to token ring, Ethernet, fast Ethernet, Fiber Distributed Data Interface (FDDI), and various twisted pair interface circuitry.

FIG. 2A shows a block diagram of the currently preferred embodiment of the data transmitter baseline wander correction circuit. Initially, the digital signal (e.g., NRZ) to be transmitted is input to comparator 201 as well as summer 206. The feedback signal ($E_{FEEDBACK}$) from one of the windings of coupling transformer 203 is fed into summer 206. Summer 206 subtracts the $E_{FEEDBACK}$ signal from the input data signal. The resulting difference signal from summer 206 is then filtered by a low-pass filter 205. In theory, negative feedback could be used to correct for all imperfections in the transformer from very low frequencies through the upper end of the data spectrum. As a practical implementation, however, a reasonable error amplifier in the feedback loop has a bandwidth of about 10 MHz for an open loop gain of 32 dB. Since the problems with baseline wander occur below approximately 1 MHz, negative feedback is applied below this point. Hence, low-pass filter 205 has a cut-off frequency of approximately 1 MHz.

The filtered signal from low-pass filter 205 is amplified by error amplifier 204. In the currently preferred embodiment, error amplifier 204 is a multi-stage amplifier having approximately 60 dB gain. The resulting error correction signal output from amplifier 204 is input to summer 202. Summer 202 adds the $E_{CORRECTION}$ to the output of comparator 201. Comparator 201 is data ground level comparator (e.g., a slicer). It compares the input digital signal to a ground level (e.g., 0 volts). Hence, the output from comparator 201 identifies the high level signals of the input data signal. It should be noted that the output signal from comparator 201 is a reconstructed waveform having a fixed level (i.e., minimal baseline wander). In other embodiments, the reference level input to comparator 201 is selected to be the voltage of the desired output baseline level. Thereby, the output from comparator 201 is at a constant baseline voltage level. The resulting summed signal from summer 202 is coupled to one of the windings of transformer 203. The feedback signal to summer 206 is taken from one of the other windings of transformer 203. The output transmit signal is sent over lines 207–208 (e.g., unshielded twisted pair wiring) which are coupled to transformer 203.

In alternative embodiments of the present invention, additional comparators and summers can be added to correct the baseline wander associated with multi-level signals. FIG. 2B shows the block diagram of one embodiment for correction of baseline wander associated with a tri-state transmit signal. The tri-state transmit signal is input to comparators 211–212 and summer 218. One example of such a tri-state transmit signal is an MLT-3 encoding scheme, whereby "0's" are represented at a ground potential and "1's" are represented at either a positive or a negative potential. The sign (i.e., either positive or negative) alternates on each transition from "0" to "1" and vice versa.

Comparator 211 compares the transmit data signal against a positive threshold (+TH) level. The positive threshold level is set to be approximately equal to half the peak positive level. Hence, the output from comparator 211 gives the positive pulses of the MLT-3 signal. In other words, comparator 211 performs the function of a positive pulse detector. Likewise, comparator 212 compares the transmit data against a negative threshold (–TH) level. The negative threshold level is set to be approximately equal to half the peak negative level. Hence, the output from comparator 212 gives the negative pulses of the MLT-3 signal. Essentially, comparator 212 performs the function of a negative pulse detector. As an example, given a 1 volt peak-to-peak MLT-3 input signal, the positive threshold is set to be 250 mV above the reference level (e.g., ground), while the negative threshold is set to be 250 mV below the reference level. Hence, the comparators 211 and 212 effectively qualifies the transmit data according to the thresholds.

The outputs from both comparators 211 and 212 are fed into summer 213. Summer 213 adds these two outputs together. Essentially, an analog sum is performed on the outputs from comparators 211 and 212. Thus, the output from summer 213 is a reconstructed MLT-3 waveform having a fixed level (i.e., minimal). This reconstructed waveform is fed into summer 214. The feedback signal from transformer 215 is subtracted from the input transmit data signal by summer 218. The resulting correction signal is filtered and amplified by filter 217 and amplifier 216 before being input to summer 214. Summer 214 adds the correction signal to the output signal of summer 213. The signal from summer 214 is then coupled to the output lines 219–220 via transformer 215.

FIG. 3 shows a circuit diagram of the currently preferred embodiment of the present invention. The transmit data signal is applied to transformer 308 through a standard differential current mode transistor pair 307. The output level is determined by the product of the load impedance and the "tail" current of the differential pair 307. A second differential pair 302 is connected in parallel with differential pair 307 and is used as a linear amplifier with enough drive capability to counteract the exponential voltage waveform created by the R/L product of the transformers and source load resistances. A third differential pair 305 is used to provide additional gain prior to the second pair. These two differential pairs 302 and 305 provide a voltage gain of about 32 dB (a factor of 40). The transistors comprising differential pairs 302 and 307 are MPSH81, manufactured and sold by Motorola, and the transistors comprising differential pair 305 are MPSH10, manufactured and sold by Motorola. A signal which is the difference between the output of the transformer and the data signal impressed on the first differential pair is represented by generator 317. This signal is low pass filtered by the combination of the two 1 Kohm resistors 314–315 and capacitor 316. This combination results in a single pole filter set to 10 KHz. This filtered signal is applied to the differential input of differential pair 305 with the phasing set such that any error signal will counteract the waveform at the summing junctions 311–312 at the output transformer 308.

The gain-bandwidth product of the filter/amplifier combination is approximately unity at 1 MHz and increases at a 20 dB/decade rate below that frequency. This provides about 20 dB of feedback at 100 KHz, resulting in reduction in error by a factor of approximately 10. If the transformer 308 has 50% droop at that frequency, this droop will be decreased to 5%.

Increasing the loop gain, low pass filter cutoff point, or transformer inductance reduces the error proportionally. However, the values of the components shown in FIG. 4 are directly applicable to silicon implementations and transformers. Furthermore, since the low frequency parameters of 100 meters of UTP cable are basically a lumped constant, the receive transformer and termination are effectively in parallel with the transmitter. Thus, compensation is provided for the receive as well as the transmit transformer.

The present invention is applicable to Token Ring concentrators, whereby many transformers are connected in parallel. Ten transformers may be placed in parallel with the same cutoff frequency of one transformer provided 20 dB of loop gain is available at the cutoff frequency of the transformer. Since Token Ring transformers already require OCLs of approximately 2 mH for a single channel and 20 mH transformers would be difficult if not impossible to implement for use in concentrators, low frequency feedback resolves this problem.

FIG. 4 shows a timing diagram of the signals at various points of the baseline wander correction circuit as depicted in FIG. 3. The output from differential pair 305 (across terminals D-E) is shown as signal 401. The output from differential pair 307 (across terminals B-C) is shown as signal 402. Note the "droop". The correction signal that is fed back to differential pair 302 (terminal A) in order to compensate for the droop is shown as signal 403. The output transmit waveform from transformer 308 is shown as signal 404. Note that the droop and baseline wander problems have been corrected.

Most Local Area Networks utilizing shielded or unshielded twisted pair wiring require coupling transformers both at the transmitter output and the receiver input at each end of the twisted pair. The main purpose of these coupling transformers is to provide dielectric isolation between the twisted pair and the equipment interfacing it in the event the twisted pair accidentally comes in contact with electrical power lines. Coupling transformers also provide protection in case a telephone twisted pair becomes connected to outside wiring, which may reach a potential of several KV in the event of lightning strikes. Additional advantages of transformer coupling include the elimination of "ground loops" caused by equipment at the ends of the cables connected to equipment using different power/ground systems, which might be at different potentials. The transformers, if constructed properly, also tend to eliminate any common mode signals which might be induced into the twisted pair cable by external noise sources. Similarly, in the case of the transmitter, the balance will tend to eliminate any common mode signals which might cause the cable to radiate electromagnetic emissions which cause radio frequency interference.

Because of the transformer coupling required by twisted pair data systems, the frequency response of the medium does not extend to DC. There is a low frequency cut-off which is inversely proportional to the parallel combination of the transmit and receive source and load resistances. Specifically the cut-off frequency is equal to: (1/OCL transmitter+1/OCL receiver)/2 PI (1/source resistance+1/load resistance). For a typical system using 100 Ohm source and load impedances and 50 uH OCL transmit and receive transformers, the cut-off frequency would be 318 KHz.

Random data has a wide spectrum in the frequency domain. In the case of Non Return to Zero (NRZ) Data, the function is a SinX/X with a peak at DC and nulls occurring at multiples of the bit rate. In actual systems, the low frequency energy is dependent upon the data content since an equal number of ones and zeros should occur in a period of time. AC coupling may be used as long as the period of no transitions in the data is much less than the time constant formed by the AC coupling element. The receiver decodes a potential in one direction as a one and the other direction as a zero. Since random data is indeterminate (run length is unconstrained) the AC coupling element (e.g., transformers) will cause "baseline wander" to occur with improper decoding of the data at the receiver zero slicer.

10Base-T Ethernet circumvents this problem by using Manchester Encoding which has the effect of inverting the spectrum of the data signal with nulls occurring at DC and at multiples of the bit rate. In this case, the passband of the signal need only extend from half the bit-rate (5 MHz in the case of 10 Mb 10Base-T) to the bit rate (10 MHz), thus eliminating problems with the AC coupling element. Token Ring uses differential Manchester with similar results, although code violations are allowed which produce lower frequency components than predicted by differential Manchester alone. Token Ring is also a cascaded system, which means the data signal may pass through as many as 260 sets of receive and transmit transformers while passing around the ring. The accumulation of low frequency phase shift caused by the coupling elements is a major contributor to jitter.

However, the move to higher data rates places limits on usage on the Manchester data encoding scheme. Twisted pair cables are typically skin effect and crosstalk limited. Both of these limitations degrade high frequency performance. A typical 100 meter data grade unshielded twisted pair cable has an upper frequency limit of approximately 80 MHz. If Manchester encoding were chosen, the data rate would be limited to 80 Mb/s. NRZ data encoding would allow data rates of 160 Mb/s under the same conditions. It is for these reasons that higher performance LAN standards typically use NRZ or MLT-3 (a multi-level code which offers slightly better EMC performance) for data transmission over data grade twisted pair cables.

As mentioned earlier, these data encoding schemes place severe requirements on the low frequency transmission properties of the medium. Economically feasible transformers place the low frequency cut-off of the medium at approximately 50 KHz. Inexpensive broadband transformers are difficult to manufacture. Lowering the cut-off frequency at the low end results in degraded transmission/balance problems at the high end of the passband exactly where most of the transmission/emission/susceptibility problems exist.

Therefore, there is a need in the art for a data transmitter baseline wander correction circuit for addressing the low frequency transformer cut-off problem by enhancing the low frequency performance of transformers used in baseband data communications. It would be preferable if such a circuit allows transformers with lower OCL to be used with equivalent performance. It would be beneficial if such a circuit allows transformers with variable inductances (from lot to lot) to be used if a known cut-off frequency is required, such as in quantized feedback schemes. If the cut-off frequency is determined by a high pass filter prior to this circuitry, the feedback may be used to diminish the variation in inductance in the transformer. Moreover, it would also be preferable if such a circuit allows the cascading of several transformers in Token Ring applications with minimal detrimental side-effects.

Thus, a data transmitter baseline wander correction circuit is disclosed.

What is claimed is:

1. A method of compensating for baseline wander of a transmit data signal corresponding to a terminal coupled to a computer network by a transformer, said method comprising the steps of:

subtracting a feedback signal received from said transformer from said transmit data signal to produce a correction signal;

filtering said correction signal;

amplifying the filtered correction signal;

generating a fixed level signal by comparing said transmit data signal to a reference potential;

summing the amplified correction signal with said fixed level signal after said correction signal has been filtered and amplified to produce an output signal;

outputting said output signal through said transformer.

2. The method of claim 1, wherein the filtering step is comprised of the step of low pass filtering said correction signal with a pole at approximately 10 KHz.

3. The method of claim 2, wherein the amplifying step is comprised of the step of amplifying said filtered correction signal by approximately 60 dB.

4. The method of claim 3, wherein the filtering and amplifying steps produce a gain-bandwidth of approximately unity at 1 MHz and increase 20 dB/decade rate below 1 MHz.

5. The method of claim 1, wherein said transmit data signal is comprised of a nonreturn to zero encoding scheme.

6. In a terminal of a computer network, an apparatus for compensating for baseline wander of a transmit data signal corresponding to said terminal, said apparatus comprising:

a transformer for AC coupling said terminal to said computer network;

a first summer coupled to said transformer for subtracting a feedback signal received from said transformer from said transmit data signal to produce a correction signal;

a filter coupled to said first summer for filtering said correction signal;

an amplifier coupled to said filter for amplifying the filtered correction signal;

a comparator for generating a fixed level signal by comparing said transmit data signal to a reference potential;

a second summer for summing the amplified correction signal with said fixed level signal after said correction signal has been filtered and amplified to produce an output signal, wherein said transformer outputs said output signal to said computer network.

7. The apparatus of claim 6, wherein said filter is a low pass filter having a pole at approximately 10 KHz.

8. The apparatus of claim 7, wherein said amplifier has approximately 60 dB gain.

9. The apparatus of claim 8, wherein said filter and said amplifier produce a gain-bandwidth of approximately unity at 1 MHz and increase 20 dB/decade rate below 1 MHz.

10. The apparatus of claim 6, wherein said transmit data signal is comprised of a nonreturn to zero encoding scheme.

11. A computer network having a plurality of interconnected terminals, comprising:

a transmission line;

a first terminal AC coupled by a transformer to said transmission line for transmitting a transmit data signal over said transmission line to a second terminal of said computer network;

said first terminal comprising:

a first summer coupled to said transformer for subtracting a feedback signal received from said transformer from said transmit data signal to produce a correction signal;

a filter coupled to said first summer for filtering said correction signal;

an amplifier coupled to said filter for amplifying the filtered correction signal;

a comparator for generating a fixed level signal by comparing said transmit data signal to a reference potential;

a second summer for summing the amplified correction signal with said fixed level signal after said correction signal has been filtered and amplified to produce an output signal, wherein said transformer outputs said output signal to said transmission line.

12. The computer network of claim 11, wherein said filter is a low pass filter having a pole at approximately 10 KHz.

13. The computer network of claim 12, wherein said amplifier has approximately 60 dB gain.

14. The computer network of claim 13, wherein said filter and said amplifier produce a gain-bandwidth of approximately unity at 1 MHz and increase 20 dB/decade rate below 1 MHz.

15. The computer network of claim 11, wherein said transmit data signal is comprised of a nonreturn to zero encoding scheme.

16. An apparatus comprising:

a first summer coupled to a transformer for subtracting a feedback signal of a winding corresponding to the transformer from a transmit data signal to provide a correction signal;

a filter coupled to the first summer for filtering the correction signal;

an amplifier coupled to the filter for amplifying the filtered correction signal;

a comparator for generating a fixed level signal by comparing the transmit data signal to a reference potential; and a second summer for summing the amplified signal with the fixed level signal to provide an output signal back to the transformer.

* * * * *